US00RE34597E

United States Patent [19]

Akeel

[11] E Patent Number: Re. 34,597

[45] Reissued Date of Patent: May 3, 1994

[54] ROBOT-LASER SYSTEM

[75] Inventor: Hadi A. Akeel, Rochester Hills, Mich.

[73] Assignee: GMFANUC Robotics Corporation, Auburn Hills, Mich.

[21] Appl. No.: 842,795

[22] Filed: Feb. 27, 1992

Related U.S. Patent Documents

Reissue of:

[64] Patent No.: 4,650,952
Issued: Mar. 17, 1987
Appl. No.: 684,248
Filed: Dec. 20, 1984

U.S. Applications:

[63] Continuation of Ser. No. 221,515, Jul. 19, 1988, abandoned.

[51] Int. Cl.[5] ..... B23K 26/00

[52] U.S. Cl. ..... 219/121.78; 219/121.79; 219/121.84; 219/121.73; 219/121.63; 901/8; 901/42; 901/47; 359/223; 359/862

[58] Field of Search ..... 219/121.83, 121.84, 219/121.78, 121.79, 121.8, 121.81; 350/486, 623, 620; 901/4, 6, 8, 42, 47, 50

[56] References Cited

U.S. PATENT DOCUMENTS

| | | | |
|---|---|---|---|
| 3,913,582 | 10/1975 | Sharon | 128/303.1 |
| 3,986,767 | 10/1976 | Rexer et al. | 219/121 L |
| 4,088,865 | 5/1978 | Peters et al. | 219/604 |
| 4,125,755 | 11/1978 | Plamquist | 219/121 LG |
| 4,317,021 | 2/1982 | Walch et al. | 219/121 LG |
| 4,364,535 | 12/1982 | Itoh et al. | 219/121 L |
| 4,402,234 | 9/1983 | Malarz et al. | 74/417 |
| 4,413,180 | 11/1983 | Libby et al. | 219/121 LV |
| 4,431,899 | 2/1984 | Racki et al. | 219/121 LG |
| 4,539,462 | 9/1985 | Plankerhorn | 219/121 LV |
| 4,542,278 | 9/1985 | Taylor | 219/121 LV |
| 4,545,713 | 10/1985 | Beni et al. | 414/1 |
| 4,550,241 | 10/1985 | Scott et al. | 219/121 LG |
| 4,563,567 | 1/1986 | Groffroy et al. | 219/121 LV |
| 4,618,758 | 10/1986 | Gilli et al. | 219/121 LG |
| 4,626,999 | 12/1986 | Bannister | 219/121 LV |
| 4,638,143 | 1/1987 | Akeel | 219/121 LG |

FOREIGN PATENT DOCUMENTS

| | | | |
|---|---|---|---|
| 2415513 | 9/1979 | France | 219/121 LV |
| 57-17675 | 4/1982 | Japan . | |
| 57-61484 | 4/1982 | Japan . | |
| 59-21491 | 2/1984 | Japan . | |
| 59-107785 | 6/1984 | Japan . | |
| 59-223188 | 12/1984 | Japan . | |
| 2134071 | 8/1984 | United Kingdom . | |
| 2153785 | 8/1985 | United Kingdom . | |

OTHER PUBLICATIONS

IBM Technical Disclosure Bulletin vol. 23, No. 6, Nov. 1980 "Laser Beam Steering System".

*Primary Examiner*—Mark H. Paschall
*Attorney, Agent, or Firm*—Brooks & Kushman

[57] ABSTRACT

A robot-laser system having a minimum number of mirrors for reflecting a laser beam from a fixed laser beam source to a desired location wherein the mirrors are mounted within the hollow, servo-controlled parts of the robot to move therewith. Only a single mirror is mounted within its associated controlled part to reflect the laser beam as it travels between adjacent controlled parts. The robot has a number of degrees of freedom constituted by two orthogonally related linear movements along intersecting longitudinal axes and two orthogonally related rotary joints having intersecting pivotal axes. Preferably, two of the mirrors are mounted so that the laser beam strikes and is reflected from both points of axes intersection within two of the controlled parts. In one of disclosed embodiments a mirror mounted in the base of the robot reflects the laser beam from the source to the other mirrors.

10 Claims, 3 Drawing Sheets

ROBOT-LASER SYSTEM

Matter enclosed in heavy brackets [ ] appears in the original patent but forms no part of this reissue specification; matter printed in italics indicates the additions made by reissue.

*This is a continuation of co-pending application Ser. No. 221,515 filed on Jul. 19, 1988 now abandoned which is a Reissue of Ser. No. 06/684,248 now U.S. Pat. No. 4,650,952.*

TECHNICAL FIELD

This invention relates to a robot-laser system and, in particular, to a robot-laser system having mirrors mounted within the moving parts of a robot for automatically controlling the path of the laser beam as the robot moves.

BACKGROUND ART

Robot capabilities range from very simple repetitive point to point motions to extremely versatile movement that can be controlled in sequence by a computer as a part of a complete integrated manufacturing system. Robots have been used in many material processing applications including cutting, trimming and welding.

Laser applications can be divided into several general categories including the measurement of spacial parameters, material heating and/or removal, non-destructive probing of resonant phenomena, communications, optical processing, laser-induced chemical reactions and weapons.

The combination of a laser with a robot allows the laser to operate with a degree of freedom previously unknown. The combination of the two technologies, if successfully performed, is suitable for most laser applications, including material processing applications. The same laser can be used in processing many kinds of materials by controlling the speed and the power of the laser. This laser can cut metal, cut glass, trim plastic or weld aluminum. Because robots are typically controlled by a programmed computer, the same computer can be used to regulate the laser's power. Consequently, in a flexible manufacturing line, parts can be cut or welded one after the other simply by adjusting the power of the laser.

Lasers are currently in operation in both commercial and industrial environments. For example, many parts of an automobile are processed with lasers. Also, a large percentage of vision systems that measure depth are laser-based.

Another industrial use of the laser is laser-assisted machining wherein the laser beam is applied in front of a cutting tool to reduce tool wear and cutting forces. Such an application results in fewer tool changes, decreased total tool wear and tool cost, increased cutting speeds and increased amounts of materials that can be cut.

Two types of lasers are typically used in material processing applications, solid state and carbon dioxide lasers. The carbon dioxide lasers are relatively unlimited in power. The solid state lasers are limited in power and require more elaborate shielding than the carbon dioxide lasers.

Popular uses of metal-working lasers include seam, spot and fusion welding, cutting, drilling, surface hardening, metal marking, scarfing, deburring, trimming and heat treating. The advantages of laser processing are particularly evident in welding. Welding done with lasers often requires no additional work such as grinding. With traditional welding, welds must be reworked a large percentage of the time. Therefore cost savings are an important aspect of laser welding.

Two methods have developed in order to link lasers with robots. One method is to move a part via a robot into the laser beam. The other way is to move the beam via the robot to the part. The latter method is effective if the part is too large to be moved easily or when contouring is necessary.

One relatively new concept of linking robots with lasers is using more than one robot to share a laser beam. Sharing systems are only limited by the cycle times of the various operations being done.

Another concept that is relatively new is mounting the laser on the top of an articulated-arm robot.

Another method of linking the robot with a laser incorporates two mirrors in each joint of a laser arm which is manipulated by the robot. The apparatus comprises a tubular linkage mechanism. The mechanism is then manipulated by the robot to direct the laser beam along the desired path. The mirrors must be held in place very securely and precisely for the beam cannot be misdirected even a fraction of a degree as it proceeds along its path. Vibrations of the robot that could affect the mirror positions must be taken into account in such a design. A focusing lens concentrates the laser energy and directs it to a singular point with a high power density. The robot must be very accurate to direct the beam to a precise area on a workpiece. A longer focal length lens can be used to compensate for robot inaccuracies. However, the resulting beam is focused over a larger area so that both power density and speed are lower.

Despite the above-noted problems in linking the laser with the robot, it is highly desirable to forge this linkage especially because the laser is an ever sharp tool having a non-contact method of operation. The use of the laser also eliminates the need for tactile feedback, adaptive circuitry, sensory perception and tool wear because the laser and the part do not touch each other.

As previously mentioned, in manipulating high power laser beams in welding robots, the beam is usually reflected off several mirrors located at the joints of a tubular linkage mechanism which has several articulations. The mechanism is then maminpuated by the robot to direct the laser focal point along the desired path. Two mirrors are usually required at each joint to direct the beam from one link orientation to another. Since manipulators generally require five to seven articulations to provide the neccessary motion to access the workpiece at a specific orientation the number of mirrors needed to provide the laser beam at the workpiece can be as many as 14. Accuracy of the laser path depends on the accuracy of the robot and laser arm and mirror alignment which are not corrected for by programming. Also, power loss, overheating and cracking, misalignment, higher cost of accuracy and space and weight limitations make this approach impractical for general purpose manipulators. Such an approach is disclosed in the U.S. Pat. No. to Sharon 3,913,582.

United States patents which disclose rotatably adjustable mirrors include the U.S. Pat. Nos. to Ayres 3,528,424, Ditto 4,059,876 and Malyshev et al 4,144,888.

The U.S. Pat. No. to Carstens et al. 4,429,211 discloses a pipe welding system including a seam tracker to keep the focal spot on the seam to compensate for axial and radial variations of the pipe. An active beam alignment system operates in real time to compensate for angular misalignment. Individually controlled mirrors reflect the laser beam in order to weld the pipe.

Other patents of less relevance include the U.S. Pat. Nos. to Mefferd et al 3,736,402, Fletcher et al 3,888,362 and Sakuragi et al 4,443,684.

DISCLOSURE OF THE INVENTION

An object of the present invention is to provide a robot-laser system which is more accurate, has a lower cost and has greater reliability than prior art robot-laser systems.

Another object of the present invention is to provide an improved robot-laser system which allows lightweight, low power, low cost manipulators to be used for heavy duty applications such as the welding of industrial components and automobile bodies. In such application, the robot will only carry and manipulate at least one lightweight mirror rather than heavy welding equipment or relatively clumsy and heavy laser beam-guiding articulations.

Yet still another object of the present invention is to to provide a robot-laser system which allows the manipulator to be built with simplicity of design, ease of use, high accuracy and low cost due to the relatively light weight of the laser beam manipulating parts of the system.

In carrying out the above objects and other objects of the present invention, a robot-laser system constructed in accordance with the present invention includes a laser beam source, a robot including a plurality of automatically movable parts and at least one mirror for reflecting the laser beam from the source to the desired location wherein the mirror is mounted on a movable part of the robot to move therewith and to reflect the laser beam as the laser beam travels between adjacent movable parts.

As a result, the robot automatically moves the mirror relative to and in synchronization with the movement of other movable parts and any other mirrors.

Further in carrying out the above objects and other objects of the present invention, the robot-laser system preferably includes a like plurality of motors. Each of the motors independently and controllably moves its respective movable part.

Also, preferably, the robot has a number of degrees of freedom constituted by two orthogonally related linear movements along intersecting longitudinal axes and two orthogonally related rotary joints having intersecting pivotal axes.

Preferably, the laser beam source is positioned at a fixed location, but may be mounted on the robot itself.

The advantages of this design are numerous including:

reduction in the required number of mirrors;

less power loss;

full control of laser beam orientation through normal robot programmability;

ease of teaching by the lead-through method; insensitivity to slight mirror misalignment in assembly since all mirrors are under active feedback control through their associated robot part in which they are mounted; and reduced cost and higher precision obtainable from use of lightweight manipulators.

Other advantages of the present invention will be readily appreciated as the same becomes better understood by reference to the following detailed description when considered in connection with the accompanying drawings.

BEST MODE FOR CARRYING OUT THE INVENTION

Figure 1:
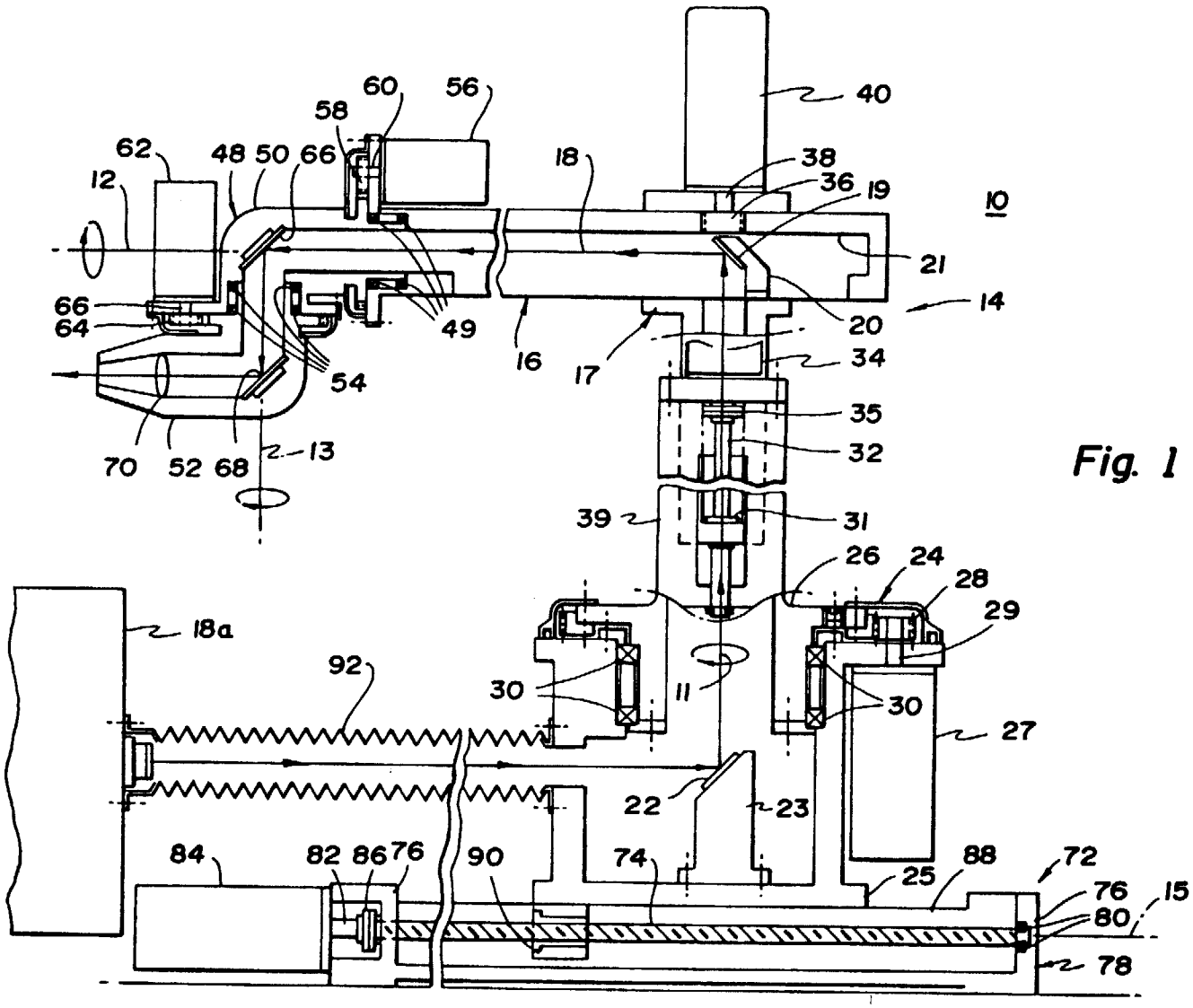
FIG. 1 is a side elevational view, partially broken away, illustrating a robot-laser system constructed in accordance with a first embodiment of the present invention.
Figure 2:
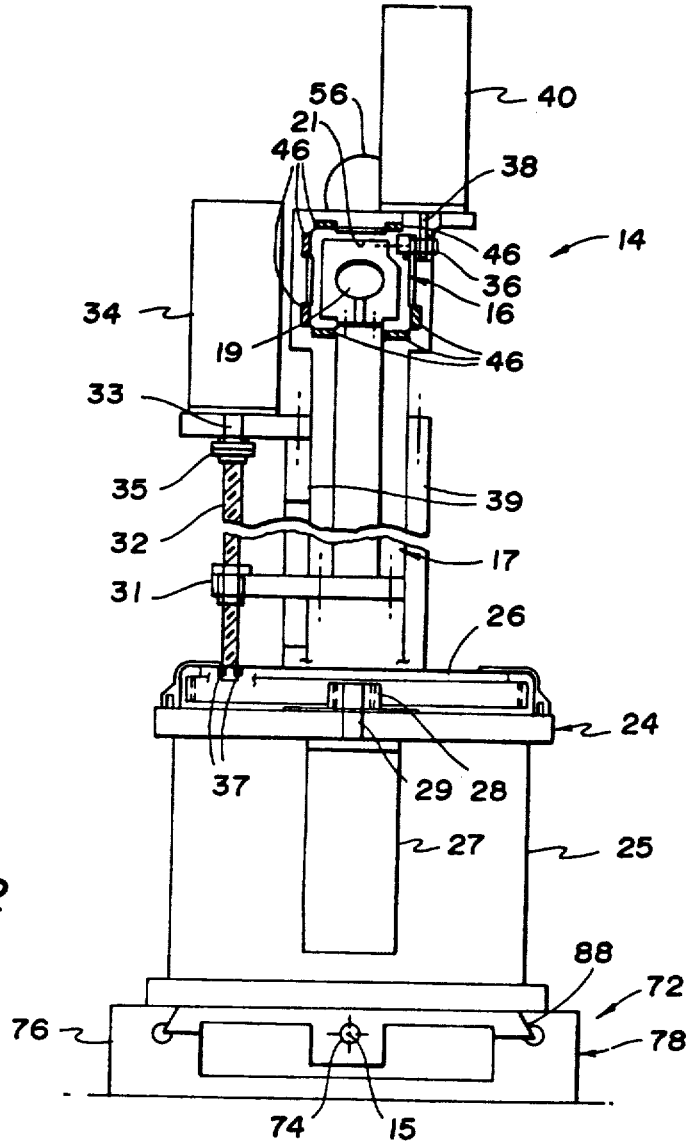
FIG. 2 is an end view, partially broken away, and in cross-section of the system of FIG. 1.

Referring now to the drawings, there are illustrated in FIG. 1 a first embodiment of a robot-laser system constructed in accordance with the present invention. The embodiment is collectively indicated at 10. The system 10 is useful in directing a laser beam to a desired location which may be occupied by a workpiece.

Briefly, the robot-laser system of FIG. 1 includes a minimum number of mirrors which are internally mounted within the moving parts of a relatively lightweight, lower power and low cost robot, generally indicated at 14. The robot 14 comprises a [six-axes] *six-axis* manipulator with freedom to rotate about axes 11, 12, and 13 and freedom to move linearly along axes 11, 12 and 13. The robot 14 can be used for such heavy duty applications as welding of industrial components such as automobile bodies. The robot 14 need only carry and support relatively lightweight mirrors instead of heavy welding equipment or clumsy and heavy laser beam-guiding articulations. This lightweight payload allows the robot 14 to be built with simplicity of design, ease of use, high accuracy and low cost.

The robot 14 comprises an arm assembly movably mounted on a hollow base, generally indicated at 24. The arm assembly includes an outer arm, generally indicated at 16 and an inner arm, generally indicated at 17. The arms 16 and 17 are hollow and are fluidly interconnected to allow a laser beam 18 generated by a laser beam source 18a to pass therethough after passing through the base 24. A [first] *third* mirror 19 is fixedly mounted on a top surface of the inner arm 17 by a support 20. A [second] *fourth* mirror 22 is fixedly supported on a mounting member 23 which, in turn, is fixedly mounted to a lower base section 25 of the hollow base 24. The support 20 is located within a cavity 21 formed in the outer arm 16 so that the laser beam 18 relfected from the [second] *fourth* mirror 22 *at a junction point 47* is, in turn, reflected at a 90° angle from the [first] *third* mirror 19 *at a junction point 41.*

The base 24 includes an upper base section 26 which rotates about the axis 11 relative to the lower base section 25 upon actuation of a servo motor 27. The servo motor 27 is mounted on the outer surface of the lower base portion 25. Bearings 30 rotatably support the upper section 26 on the lower section 25. The servo motor 27 is mechanically coupled to the upper base section 26 by gearing 28 mounted on the output shaft 29 of the servo motor 27 to rotate therewith.

The inner arm 17 and, consequently, the entire arm assembly is mounted on the upper base section 26 to rotate therewith. More particularly, a lower portion of the inner arm 17 is connected to a drive nut 31 which is threadedly engaged on a drive screw 32, one end of which in turn, is rotatably supported at the top of the upper base section 26 by bearings 37. The opposite end of the screw 32 is coupled to the drive shaft 33 of a servo motor 34 by a coupling 35. The servo motor 34, in turn, is fixedly mounted on a U-shaped suport 39 of the upper base section 26. The inner arm 17 is slidably supported within the support 39. Because the drive screw 32 is fixedly connected to the lower portion of the inner arm 17, rotation of the drive screw 32 alternately raises or lowers the inner arm 17 along the axis 11 relative to the support 39.

The outer arm 16 moves linearly along the axis 12 by mens of a rack and pinion gear connection to a servo motor 40 mounted on the inner arm 17. More particularly, a pinion gear 36 is mounted on a drive shaft 38 of the servo motor 40 to rotate therewith. A rack 42 is fixedly mounted on the outer arm 16 in driving engagement with the pinion gear 36. A slide portion 44 of the inner arm [16] *17* is slidably supported within the arm 17 by linear bearings 46.

The robot 14 also includes a [two-axes] *two-axis* wrist mechanism, generally indicated at 48, which is supported for rotation about [the] *a first wrist* axis 12 on the outer arm 16 by bearings 49. The wrist mechanism 48 includes a hollow inner knuckle 50 and a hollow outer kauckle 52 supported on the inner knuckle 90 for rotation about the axis 13 by bearings 54. *The axes 12 and 13 intersect at a first junction point 43.* The inner knuckle 50 is rotatably driven about the axis 12 by a servo motor 56 which is mounted on the top surface of the outer arm 16. Gearing 58 interconnects the inner knuckle 50 to the drive shaft 60 of the servo motor 56 to transfer the rotary motion of the drive shaft 60 to the inner knuckle 90.

In the same fashion, the outer knuckle 52 is rotatably driven about [the] *a second wrist* axis 13 by a servo motor 62 which is mounted on the inner knuckle 50. Gearing 64 interconnects the outer knuckle 52 to the drive shaft [66] *67* of the servo motor 62 to transfer the rotary motion of the drive shaft [66] to the outer knuckle 52.

A [third] *first* mirror 66 is fixedly mounted on the inner surface of the inner knuckle 50 to reflect the laser beam 18 between the [second] *third* mirror 19 and a [fourth] *second* mirror 68 which is fixedly mounted on the inner surface of the outer knuckle 52. A focusing lens 70 is fixedly mounted 46 within the outer knuckle 52 between the mirror 68 and the free end of the wrist mechanism 40 to focus the laser beam 18 [on] *along a third wrist axis 69 and onto* a workpiece for worpiece or material processing. *The axes 13 and 69 intersect at a second junction point 45.*

The lower section 25 of the base 24 is mounted for sliding movement along the axis 15 on a track, generally indicated at 72. The track 72 includes a drive screw 74 which extends between a pair of spaced apart flange portions 76 of an elongated support, generally indicated at 78. One end of the drive screw is rotatably supported on the support 78 by bearings 80. The other end of the drive screw 74 is in driving engagement with the drive shaft 82 of a servo motor 84 through a coupling 86. The servo motor 84 is mounted on the support 78.

The base 24 of the robot 14 is mounted on a slide member 88 which in turn, is mounted for movement on the drive screw 74 by a drive nut 90. Extensible light shields or bellows [92] *91* extend between the laser source 18a and the lower section 25 of the base 24 to protect the laser beam from the environment during movement of the robot 14 on the track 72.

The laser beam source 18a is preferably located in a fixed position. However, it is to be understood that alternatively, the laser beam source may be mounted on the wrist, the base or the inner or outer arms of the robot 14 depending on the weight of the laser beam source and the load-carrying capacity of the particular robot part.

The laser beam 18 is aimed in a direction parallel to the axis 15 so that it is reflected by the mirror 22 to travel along the axis 11 until it strikes the mirror 19. The laser beam 18 reflects off the mirror 19 and travels along the axis 12 until it strikes the mirror 66. The laser beam 18 then reflects off the mirror 66 and travels along the axis 13 until it strikes the mirror 68. The laser beam 18 reflects off the mirror 68 and travels along an axis 69 spaced apart and parallel to the axis 12. The lens 70 focuses the laser beam 18 before the laser beam 18 exits the wrist mechanism 48. Alternately, the mirror 68 can be shaped as a focusing mirror to eliminate the lens 70.

While not shown, the robot 14 may include other equipment such as grippers, fixtures or other equipment. Also, the robot-laser system 10 may include additional mirrors in order to help in directing the laser beam 18 favorably to a workpiece.

Figure 3:
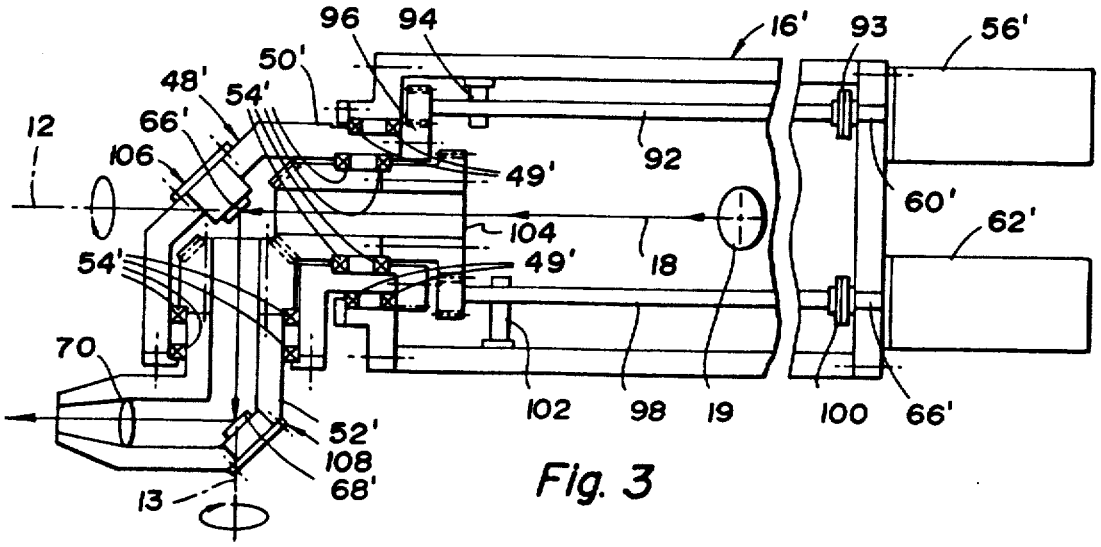
FIG. 3 is an enlarged side elevational view, partially broken away, of a second embodiment of a wrist mechanism of the robot-laser system.
Figure 4:
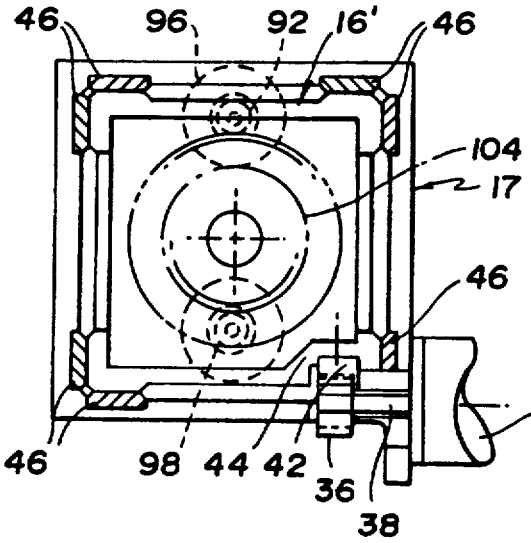
FIG. 4 is an end view, partially broken away, of the wrist mechanism of FIG. 3 rotated 90°.

Referring now to FIGS. 3 and 4 there is illustrated a second embodiment of a wrist mechanism 48′ including servo motors 56′ and 62′ and mounted at the free end of a modified outer arm 16′ for rotation of its inner and outer knuckles 50′ and 52′, respectively.

The servo motor 56′ rotatably drives the inner knuckle 50′ through a shaft 92 which is coupled at one end thereof to the rotary drive shaft 60′ of the servo motor 56′ by a coupling 93. The shaft 92 extends in a direction parallel to the axis 12 and is rotatably supported therein by a bearing block 94. Gearing 96 couples the inner knuckle 50′ to the opposite end of the shaft 92. Bearings 49′ rotatably support the inner knuckle 50′ on the outer arm 16′.

In a similar fashion, the servo motor 62′ rotatably drives the outer knuckle 52′ through a shaft 98 which is coupled at one end thereof to the rotary drive shaft [66′] *67′* of the servo motor 62′ by coupling 100. The shaft 98 extends along a direction parallel to the axis 12 and is rotatably supported therein by a bearing block 102. Gearing, including a central gear 104 couples the outer knuckle 52′ to the opposite end of the shaft 98. Bearings 54′ rotatably support the outer knuckle 52′ and the central gear 104 on the inner knuckle 50′.

Externally mounted mirror assemblies, generally indicated at 106 and 108, are adjustably mounted on the inner and outer knuckles 50′ and 52′, respectively, to allow adjustment of the position of their corresponding mirrors 66′ and 68′.

Figure 5:
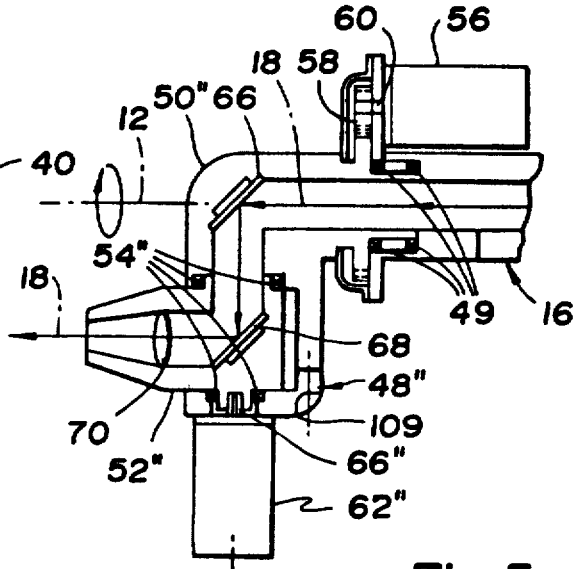
FIG. 5 is a side elevational view, partially broken away, of a third embodiment of a wrist mechanism of the robot-laser system

Referring now to FIG. 5 there is illustrated a third embodiment of a wrist mechanism, generally indicated at 48″. The mechanism 48″ is substantially the same as the wrist mechanism 48 except that an outer knuckle 52" is directly coupled to the rotary drive [axis 66"] *shaft 67"* of a servo motor 62" to rotate about the axis 13. The servo motor 62" is mounted on a flange member 109 fixedly mounted on the inner knuckle 50". Bearings 54" rotatably support the outer knuckle 52" on the inner knuckle 50".

Figure 6:
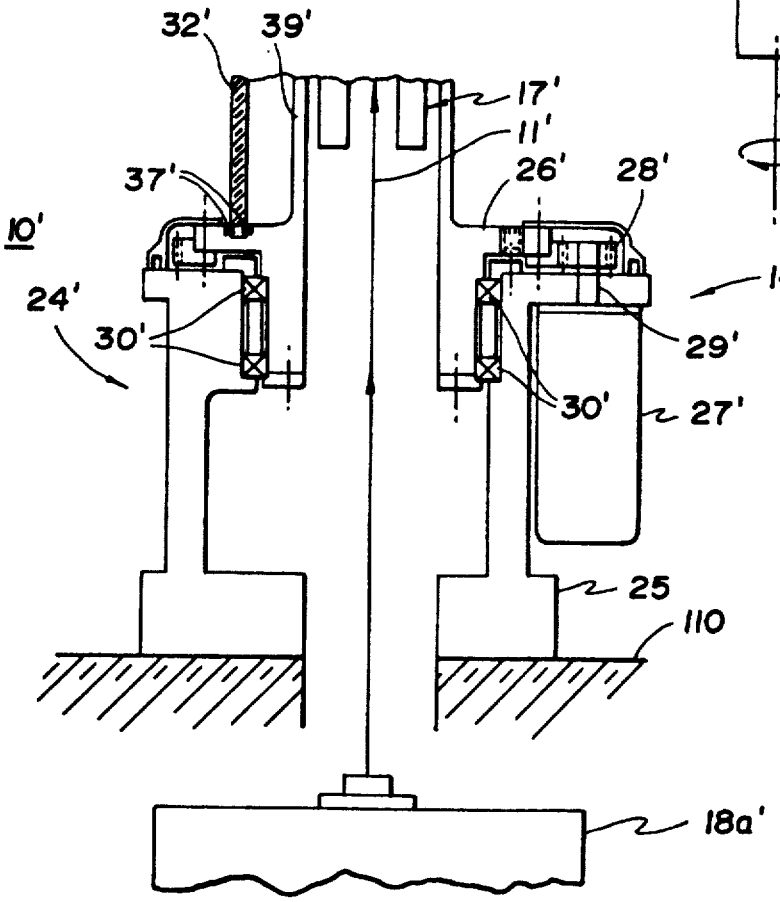
FIG. 6 is a side elevational view, partially broken away, illustrating a second embodiment of a robot-laser system constructed in accordance with the present invention.

Referring now to FIG. 6 there is illustrated a second embodiment of a robot-laser system collectively indicated by reference numeral 10'. The system 10' includes a robot, generally indicated at 14', which is mounted on a floor, such as a factory floor 110 which has space there-under for mounting a laser source 18a' therein. For the sake of simplicity, only the bottom portion of the robot 14' is shown since the top portion is substantially identical to that of the robot 14. The robot 14' comprises a five-axes manipulator with freedom to rotate about three axes (only one of which is shown at 11' in FIG. 6) and freedom to move linearly along two axes (only one of which is shown at 11' in FIG. 6). The construction of FIG. 6 allows the mirror 22 to be eliminated.

TEACHING THE ROBOT OF THE ROBOT-LASER SYSTEM

In programming or teaching any one of the robots 14 or 14', the positions of the mirrors are ignored since they are fixed relative to the robot part in which they are mounted. Teaching can be done by beaming a low power laser beam or ordinary light via a source (not shown) which is temporarily attached to the robot. Such a light beam will simulate the path of the high power beam under normal operation. After such a source is attached to the robot, the robot can be led through a desired path by any of several commonly utilized methods. One method, such as used with light-weight manipulators, is simply to lead the unpowered manipulator by hand. Another is to command individual axes to move as desired from a push button terminal or by means of a joy stick (neither of which are shown). A third method utilizes a force sensing device (not shown) which is attached to the robot and senses the force applied when the robot is led through its path. The programmable controller is utilized to read the sensor transducer outputs to command the drive circuits of the actuators or servos of the robot and provide the desired motion.

The operator decides on the desired path by aiming the light beam to the desired location on the workpiece At specific points along the desired path, [axes] *axis* positions can be recorded as well as the desired status of the laser beam i.e. whether it is triggered "on" or "off" at what power level when "on". The recording command is usually input by pushing a button that commands the controller to read the output of the several feedback devices. These devices may indicate the position of the robot actuators and/or the status of the support equipment at any recording point.

Once path points are recorded they are usually stored in computer memory or peripheral discs for recall in a playback mode whereby the robot can retrace the path described by the recorded points. In the playback mode the force sensor, if used, can be removed as well as any auxiliary light beam source.

The advantages of the above-described robot-laser systems are numerous. For example, the number of mirrors required to be used in manipulating the laser beam has been greatly reduced from the number required by the prior art. There is less power loss and there is full control of laser beam orientation through robot programmability. Teaching such robot-laser systems through the lead-through method is made relatively easy. Furthermore, slight mirror misalignment in assembly is not fatal since all the mirrors are under active feedback control through their associated robot part in which they are mounted. Finally, the reduced cost and the higher precision attainable by use of light-weight manipulators enhances the commerical prospects of such robot-laser systems.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A robot-laser system for providing a laser beam at a desired location, the system comprising:

a laser beam source for generating a laser beam;

a robot having at least three degrees of freedom and including a base and a *single motorized* robot arm *having a motor mounted on said arm* supported on said base, the robot arm having first and second elongated arm parts, the second arm part projecting from the first arm part, the robot arm having a wrist mechanism located at the distal end of the second arm part, said arm parts and said wrist mechanism being hollow and fluidly interconnected to define a laser beam path therewithin extending through said first arm part, along the entire projecting length of said second arm part and through said wrist mechanism, said arm parts and said wrist mechanism being adpated to direct the laser beam therewithin; [and]

at least one mirror for reflecting the laser beam, a single mirror being mounted to and supported by said arm therewithin at a position of fluid interconnection between the arm parts to move therewith and reflect the laser beam wherein a first one of said degrees of freedom comprises a linear movement of said first arm part along an axis coincident with said laser beam path, a second one of said degrees of freedom comprises a linear movement of said second arm part along a second axis coincident with said laser beam path through the second arm part and a third one of said degrees of freedom comprises a rotary movement of one of said arm parts about said laser beam path*; and*

*first and second drive means for linearly driving the first and second arm parts, respectively, and third drive means for rotatably driving the one of said arm parts about said laser beam path.*

2. A robot-laser system for providing a laser beam at a desired location, the system comprising:

a laser beam source for generating a laser beam;

a robot having at least three degrees of freedom and including a hollow base and a *single motorized* robot arm *having a motor mounted on said arm* suported on said base, the base being fluidly interconnected to said source, the robot arm having a hollow first arm part and an elonaged, hollow second arm parts and said wrist mechanism being adapted robot arm having a hollow wrist mechanism located at a distal end of the second arm part, said wrist mechanism having at least one rotational axis and at least one knuckle rotatably supported on said axis; said first arm part being fluidly interconnected with said base, said first arm part being fluidly interconnected to said second arm part and said second arm part and said wrist mechanism being fluidly interconnected to define a laser beam path therewithn extending through the base, through the first arm part, along the projecting length of said second arm part and through said wrist mechanism; said base, said first and second arm parts and said wrist mechanism being adpated to direct the laser beam therewithin; [and]

at least two mirrors for reflecting the laser beam, a first one of said mirrors being mounted to and supported by said knuckle therewithin to move therewith and reflect the laser beam, and a single mirror being supported by said arm therewithin at a position of fluid interconnection between the arm parts to reflect the laser beam to the first one mirror wherein a first one said degrees of freedom comprises a linear movement of said first arm part along an axis coincident with said laser beam path, a second one of said degrees of freedom comprises a linear movement of said second part along a second axis coincident with said laser beam path through the second arm part and a third one of said degrees of freedom comprises a rotary movement of one of said arm parts about said laser beam path; *and*

*first and second drive means for linearly driving the first and second arm parts, respectively, and third drive means for rotatably driving said one of said arm parts about said laser beam path.*

3. The invention as claimed in claim 1 or claim 2 wherein said robot has at least five degrees of freedom.

4. The invention as claimed in claim 1 or claim 2 wherein said first and second degrees of freedom are constituted by two orthogonally related linear movements along intersecting longitudinal axes, and wherein the single mirror is mounted so that the laser beam strikes the single mirror at the point of intersection of the longitudinal [axis] *axes.*

5. The invention as claimed in claim 1 or claim 2 wherein the number of mirrors is less than the number of degrees of freedom of the robot.

6. The invention as claimed in claim 1 or claim 2 including focusing means mounted on said robot for focusing the reflected laser beam at the desired location.

7. The invention as claimed in claim 6 wherein said focusing means comprises a focusing lens.

8. The invention as claimed in claim 1 or claim 2 including a track wherein said robot is mounted on said track to move thereon.

9. The system as claimed in claim 1 or claim 2 wherein said base is fluidly interconnected to said source by an aperture extending completely through a wall of said base.

*10. The system of claim 1 or claim 2 wherein each of said first, second and third drive means includes a servo motor.*

* * * * *